Patented Nov. 7, 1944

2,362,014

UNITED STATES PATENT OFFICE 2,362,014

PRODUCTION OF CITROUS FEED

Arthur W. Lissauer and Julius Credo, Louisville, Ky., assignors, by mesne assignments, to Citrus Processes, Inc., Louisville, Ky., a corporation of Kentucky No Drawing. Application December 24, 1941, Serial No. 424,238

7 Claims. (Cl. 99—2)

This invention relates to the treatment of citrous waste, and more particularly, to the recovery of all the feed values thereof.

A substantial but incomplete or partial recovery of the feed values contained in citrous waste has heretofore been made by what may be termed the "lime-dewatering process." This process, comprises: the steps of treating the waste with an alkali, such as lime, to convert it from a slimy unpressable condition to a watery pressable condition; aging, if desired; and pressing the converted waste. The pressed waste makes an excellent but unstable feed. Hence, to preserve it indefinitely and facilitate shipment and handling, it is usually dried.

As a result of the lime-dewatering process, a considerable amount of citrous effluent is released. This effluent which contains approximately 8% solids has a high food value due largely to its carbohydrate content. Furthermore its 8% solids represents, if recovered, a gain of approximately 60% over the partial recovery. However no practical method of recovering the effluent feed values has been devised so far as is known; hence the practice has been to waste the effluent, usually by discharging it into a drainage system where due to its high B. O. D., it ferments, producing an extremely noxious condition. This practice is so objectionable that public health authorities are becoming more and more disposed to condemn it as a nuisance, and in some communities have already taken steps in that direction.

Prior methods of treating citrous wastes for total recovery of the feed value have not been successful for a number of reasons. In some methods, it has been proposed merely to grind untreated waste and dry the whole material thus obtained. With such procedure, it has been found that all of the released liquid cannot be reabsorbed by the solids, and upon drying, the unabsorbed portions of the liquid in contact with the surfaces of the drier and the outer surfaces of the solid particles form a sticky coating which reduces the efficiency of the drier and seals the solid particles to an extent that the interiors thereof cannot be dried. Undesirable caramelization occurs during the drying operation and the expense of water removal is prohibitive. Because of the more or less glazed coating, the particles are non-homogenous and cannot absorb water; furthermore, the material ferments and spoils upon standing.

What appears to be a similar problem has been encountered in the processing of distillery slop wherein it has long been the practice to strain the thin slop from the coarse solids and evaporate the thin slop to a gluey consistency having a solid content approximating 30%. While the concentrate is referred to as a "syrup," it is not a true syrup because it has a negligible sugar content, the sugars having been previously converted to alcohol and removed. This gluey concentrate is then divided into at least two, and usually three, parts, and one part mixed with the coarse solids (which have been dewatered by pressing and may or may not have been predried) and the mixture dried. The second part of the concentrate is then mixed with the dried solids and the mixture dried. These latter steps are followed for each remaining part. It obviously is economically impractical to apply this process to citrous effluent particularly since its high sugar content could be expected to produce a mass of such syrupy characteristics, first, that it would be difficult to absorb, and, second, its absorption would require additional mixing and drying steps.

The present invention is directed to the elimination of the objectionable practice of wasting the citrous effluent, and to the improvement of the prior methods of treating citrous wastes, and has for its principal objects, the provision of a highly practical method for completely recovering all citrous waste feed values together with the added lime or other treating medium; and the production of a measurably superior citrous waste feed product having, in addition to the added lime or other treating medium, all of the feed values originally contained in the citrous waste from which it was produced, and high water absorbent properties.

More particularly, the objects of this invention are to provide a method which is highly practical in that it can be performed with but little additional apparatus and without increasing the production cost per ton; and to produce a superior feed product which contains all the feed values of the original waste including all the carbohydrates in the form of an absorbed syrup which renders the feed far more palatable; without preventing, as one might expect, the securing of the highly desirable water absorbent property in the food.

Another important object is to maintain the water content of the citrous effluent at a minimum in order to minimize the cost of treating the effluent.

Still a further object is to conduct the processing under predetermined conditions of hydrogen ion concentration to secure a more palatable feed, and facilitate and reduce the cost of the evaporation.

One phase of our invention resides in the discovery that citrous effluent can be evaporated, at a temperature low enough to avoid caramelization of the carbohydrates, to form a syrupy concentrate having a solids content usually approximating 70% but ranging, in some instances, as high as 80%; that, despite the very syrupy nature of this concentrate, it not only is absorbable by the pressed waste but its entire volume can be satisfactorily absorbed in one single-shot mixing operation; and that such mixture can be dried in the customary manner to form a palatable feed having marked water-absorption properties and yet, at the same time, being sufficiently non-hygroscopic that it will not become soggy by absorbing moisture from the atmosphere. We thus are able to effect a complete recovery of all feed values and produce a superior product simply by dewatering the waste, evaporating the effluent to a syrupy concentrate, mixing the concentrate with the pressed waste in a single-shot mixing operation, and drying the mixture. The term "single-shot mixing operation" is used herein to designate a practice wherein the wet solids are subjected to a single shot of syrup before drying as distinguished from the distillery practice, for example, wherein the solids are subjected to more than one shot of syrup and dried or partly dried between shots.

In practicing this invention, the lime-dewatering process is carried out in the manner already described to produce pressed waste and citrous effluent, the amount of lime usually ranging from 0.3 to 0.5% by weight. When an aging step is inserted between the treating step and the pressing, a portion of the effluent (termed "bin effluent") is secured from the aging step and another portion (termed "press effluent") from the pressing step. Instead of following the customary practice of adding water from an outside source to the lime, some of the effluent, preferably the bin effluent, is recirculated and used as the lime-dispersing agent. The bin effluent is relatively clear and its use minimizes the amount of water contained in the effluent and thus correspondingly reduces the cost of the subsequent evaporation.

The remainder of the bin effluent and that derived from the pressing operation are evaporated under vacuum at a temperature low enough to avoid caramelization of the carbohydrates. Excellent results can be obtained economically by proceeding with the evaporation to a point where the solids in the syrup range from 70 to 80%. At this stage the syrup contains from 45 to 50% sugars.

While any suitable form of vacuum evaporator may be used, a triple-effect evaporator lends itself to the economical performance of this operation without introducing excessive equipment cost. In a triple-effect evaporator, the effluent is fed successively through three evaporator chambers, the vapor from the first chamber being used to heat the effluent in the second chamber and the vapor from the second being used to heat the effluent in the third chamber. The vapor from the third chamber discharges into a condenser.

The syrup thus obtained may be mixed directly with the pressed or wet solids in some suitable mixing device such as a pug mill. It has been found necessary to mix the syrup with wet solids since a feed having high water absorption properties cannot be obtained when the syrup is mixed with dry solids because the syrup is then adsorbed and not absorbed. The mixture of pressed solids and syrup which normally contains approximately 62% moisture should be given sufficient time to permit the solids to absorb the syrup but this should not require more than 30 minutes where the mixing operation is thoroughly performed. While not essential, it is desirable to perform the mixing operation at a temperature above atmospheric and below the caramelization point of the contained carbohydrates. A mixing temperature of between 120° and 150° F. has been found to give excellent results.

While the resultant mix is suitable for feed purposes, it is unstable over long periods and it is preferred to dry it. The mixture may be dried in customary manner to reduce the moisture content to about 8%. A low temperature drier should be used and the drying operation performed with the drying at a temperature obtained when dry steam at approximately 36 lbs. pressure is used. As the drying temperature increases above this limit, caramelization is more likely to occur.

It is desirable to introduce dried feed into the mixing conveyor with the mixture of pressed solids and syrup going to the drier. The dried feed operates to scour the tubes of the drier and thereby prevents the wet feed from sticking to or burning on the tubes. Additionally it insures a more efficient use of the drying surfaces of the drier and to that extent maximizes the drier efficiency. While the amount of dried feed to be thus added may vary, we prefer to add an amount roughly equal to 20% of the dried output of the drier. This quantity reduces the average moisture content of the mixture from approximately 62% to approximately 60%. The dried output of the drier may be handled and bagged in the usual manner.

As evident from the foregoing, this method possesses a number of advantages. It renders possible the complete recovery of all feed values originally contained in the citrous waste along with the added lime; it eliminates the necessity of adding lime water derived from outside sources and correspondingly reduces the amount of water in the effluent; it eliminates the necessity of wasting the effluent; it requires very little additional equipment over that necessarily employed in the lime-dewatering and drying process; and it enables a complete recovery with very little or no increase in the production cost per ton.

Additionally the resulting product is definitely superior to that heretofore produced. It contains all the feed values of the original waste, including the added lime and 70 to 75% carbohydrates. This extremely high sugar content which is a gain of about 400# per ton of dried feed in the recovery of sugars alone, measurably increases the feed value and palatability of the feed. Since the carbohydrates are absorbed and not adsorbed, the feed has high water absorption properties, being capable of absorbing as much as three times its weight of water in approximately one minute. This is a particularly important property in stock feeds of this general character.

However the foregoing process is possessed of some disadvantages in that the resultant feed tends to be somewhat bitter. Moreover considerable corrosion occurs in the evaporators and the tubes thereof tend to become coated with organic matter. In addition there is considerable objectionable foaming in the evaporators.

We have discovered that the aforesaid disadvantages can be eliminated and a more palatable feed product obtained by manufacturing the effluent at a pH value in the alkaline range during its evaporation, this discovery constituting a second phase of our invention.

Our invention contemplates the addition of an increased amount of lime or other alkaline agent (added at any stage prior to evaporation) to such an extent as to maintain the effluent definitely alkaline.

The desired alkalinity of the effluent can be effected and maintained during its evaporation, either by (1) sufficient "overliming" when lime or other treating medium is first added, i. e. adding lime or an equivalent non-toxic alkaline compound in excess of that required to convert the waste to a condition where it can be dewatered, or (2) by the addition of an alkaline compound such as alkali or alkaline earth hydroxides, carbonates, etc. or more lime at any point prior to evaporation.

This maintenance of the pH value in the alkaline range not only produces a syrup having the desired properties heretofore noted but also apparently minimizes hydrolysis of the contained sugars to lower sugars or glucose. It further eliminates foaming in the evaporators and coating of the tubes thereof, and permits the use of more reasonably priced materials in evaporator construction.

The excess of alkali has also been found substantially to destroy the naringin which is the bitter ingredient in the effluent, thus providing a more desirable flavor in the final product. While the excess of alkali tends to turn the naringin and other constituents of the effluent to a undesirable dark red color, the addition of a cannery acid, such as citric acid or an acid such as phosphoric or acetic in an amount to neutralize or render the syrup slightly acid, will bleach the dark red color and return the syrup to the desired light straw color. Stronger acids such as sulfuric or hydrochloric acid may be used. Preferably they are added in an amount to secure the desired bleaching.

The bleached syrup when mixed with the wet solids, which are also of a light color, produces a highly acceptable and light-colored finished product which has all the desirable characteristics of the product produced by the process first described with the additional feature of substantial elimination of the prior bitter taste.

Best results in the modified process (wherein the effluent is maintained alkaline) have been secured when sufficient lime or other alkaline material is added to secure an equilibrium pH value of about 8 after sufficient time has elapsed for the mix to reach equilibrium. Usually lime in the proportion of 0.6% to 5.0%, or the equivalent in other alkaline material, based on the weight of the original waste, is added.

If the same compound is to be used as both the treating or converting medium and as the alkalizing agent, a sufficient amount of that compound in excess of that required for the conversion step is initially added to render and maintain the combined bin and press effluent, or the press effluent if there is no aging, definitely alkaline with an equilibrium pH in the alkaline range. Where soda ash or another alkaline compound is used, it is preferably added to the bin effluent, when the aging step is used, in sufficient amount to render the eventually combined effluents definitely alkaline after equilibrium has been reached and to insure their so remaining throughout and after their evaporation to a syrup. Where the aging step is not used, the same amount of soda ash or other alkaline compound is added to the press effluent. In either case, it is only essential that the alkalizing agent be added before evaporation so that the desired equilibrium pH in the alkaline range be secured and maintained during evaporation.

The alkalized effluent (however obtained) is, evaporated under the conditions already described. In practice, it has been found that the vapors of an acidic effluent are inherently corrosive due to their volatile acid content whereas the vapors of an alkaline effluent are not.

As a specific example of a method of practicing the alkaline process just described, 20,000 lbs. of citrous waste and 80 lbs. of lime were ground to a pulp in a hammer mill. The pulp was pressed hydraulically, a total of about 13,000 lbs. of effluent, containing about 8% of dissolved solids, being secured. The effluent was alkalized by the addition of sufficient soda ash to raise and maintain the pH value to a value slightly above 7. At this stage, the effluent had a dark red color due to the destroyed naringin and other constituents. It was then evaporated in a triple-effect evaporator to about 1500 lbs. of syrup containing about 75% solids.

Sufficient acetic acid was added to the syrup to bleach the color, the syrup then being added to and absorbed by the warm or hot solids resulting from the pressing operation. The resultant mixture was dried in a suitable drier to produce about 3200 lbs. of light-colored, substantially homogeneous stable feed.

It is intended that the term "lime-dewatering process" as used herein be understood as including processes wherein lime and equivalent alkaline compounds are employed, and that the term "lime," wherever used, be understood as including such equivalent alkaline compounds as well as lime.

This application is a continuation-in-part of our application Serial No. 298,985 filed October 5, 1939.

Having described our invention, we claim:

1. An improvement in the lime-dewatering process, wherein slimy unpressable acidic citrous waste is converted by an alkaline reagent into a watery, pressable waste which is separated into a watery effluent and wet solids and the wet solids dried, comprising: treating the water forming the effluent with an alkaline material to render the effluent definitely alkaline; evaporating the alkaline effluent, at a temperature low enough to avoid appreciably caramelizing its carbohydrates, to form a syrupy alkaline concentrate; acidifying the alkaline concentrate to bleach it; and mixing the bleached concentrate with the wet solids before the solids drying operation.

2. A method of recovering the feed values of slimy unpressable acidic citrous waste comprising: converting the waste with an alkaline reagent into a watery pressable waste; separating the watery effluent from the wet solids; treating the water forming the effluent with enough alkaline material to render the effluent definitely alkaline; evaporating the alkaline effluent, at a temperature low enough to avoid appreciably caramelizing its carbohydrates, to form a syrupy alkaline concentrate; acidifying the alkaline concentrate to bleach it; single-shot mixing the bleached concentrate with the wet solids; and drying the mixture.

3. The method defined in claim 2 wherein: the converting and treating steps are simultaneously performed by controlling the quantity of alkaline reagent to produce a watery alkaline waste.

4. The method defined in claim 2 wherein: the quantity of alkaline reagent used in the converting step is controlled to produce a water acidic waste; and the treating step is performed on the acidic effluent separated from the watery waste.

5. A method of recovering the feed values of slimy unpressable acidic citrous waste comprising: converting the waste with an alkaline reagent into a watery pressable acidic waste; separating the watery acidic effluent from the wet solids; treating the acidic effluent with enough alkaline material to render it definitely alkaline; evaporating the alkaline effluent, at a temperature low enough to avoid appreciably caramelizing its carbohydrates, to form a syrupy alkaline concentrate having a solids content not substantially less than 70%; acidifying the alkaline concentrate to bleach it; single-shot mixing the bleached concentrate with the wet solids; and drying the mixture.

6. A method of recovering the feed values of slimy unpressable acidic citrous waste comprising: converting the waste with an alkaline reagent into a watery pressable waste; separating the watery effluent from the wet solids; treating the water forming the effluent with enough alkaline material to render the effluent definitely alkaline; and evaporating the alkaline effluent to form a syrupy alkaline concentrate.

7. The method of claim 6 wherein: the alkaline concentrate is acidified to bleach it.

ARTHUR W. LISSAUER.
JULIUS CREDO.